United States Patent
Horton

(10) Patent No.: US 9,043,963 B2
(45) Date of Patent: Jun. 2, 2015

(54) TREE STUMP EXCAVATION TOOL

(71) Applicant: Lee A Horton, Jefferson, MA (US)

(72) Inventor: Lee A Horton, Jefferson, MA (US)

( * ) Notice: Subject to any disclaimer, the term of this patent is extended or adjusted under 35 U.S.C. 154(b) by 0 days.

(21) Appl. No.: 13/737,618

(22) Filed: Jan. 9, 2013

(65) Prior Publication Data

US 2014/0190043 A1 Jul. 10, 2014

(51) Int. Cl.
*A01G 23/06* (2006.01)

(52) U.S. Cl.
CPC ..................... *A01G 23/062* (2013.01)

(58) Field of Classification Search
USPC ........... 37/302, 301, 444; 172/698; 144/24.12
See application file for complete search history.

(56) References Cited

U.S. PATENT DOCUMENTS

| | | | | | |
|---|---|---|---|---|---|
| 2,303,415 | A | * | 12/1942 | Williams | 37/301 |
| 2,506,662 | A | * | 5/1950 | Cusenbary | 37/302 |
| 2,770,076 | A | * | 11/1956 | Kluckhohn | 47/58.1 R |
| 3,033,253 | A | * | 5/1962 | Purdy | 144/34.1 |
| 3,101,794 | A | * | 8/1963 | Bechman | 172/698 |
| 3,119,421 | A | * | 1/1964 | Marine | 144/34.5 |
| 3,512,276 | A | * | 5/1970 | Juhl | 111/101 |
| 3,557,850 | A | * | 1/1971 | Owens et al. | 144/34.6 |
| 3,809,135 | A | * | 5/1974 | Dove | 144/34.6 |
| 4,010,805 | A | * | 3/1977 | Kelley | 172/698 |
| 4,094,348 | A | * | 6/1978 | Wolf | 144/34.6 |
| 4,321,761 | A | | 3/1982 | Hedblom | |
| 4,355,475 | A | * | 10/1982 | Harkness | 37/301 |
| 4,356,644 | A | | 11/1982 | Harkness | |
| 4,682,638 | A | * | 7/1987 | Becker | 144/24.12 |
| 5,133,268 | A | * | 7/1992 | Delisle | 37/302 |
| 5,490,340 | A | * | 2/1996 | Muncy | 37/301 |
| 6,035,562 | A | | 3/2000 | Virnig et al. | |
| 6,401,369 | B1 | | 6/2002 | Turner | |
| 6,662,479 | B2 | * | 12/2003 | Chaney | 37/301 |
| 7,322,133 | B2 | * | 1/2008 | Horton | 37/404 |
| 7,739,815 | B2 | * | 6/2010 | Horton | 37/452 |
| 2004/0148820 | A1 | * | 8/2004 | Horton | 37/411 |
| 2006/0070267 | A1 | * | 4/2006 | Horton | 37/404 |
| 2007/0180743 | A1 | * | 8/2007 | Horton | 37/404 |
| 2011/0126434 | A1 | * | 6/2011 | Horton | 37/444 |

OTHER PUBLICATIONS

*The Root Talon*; www.roottalon.com; Root Talon.
*Tree Grubbers*; www.dymaxinc.com/attachments/7780/; Dymax, Inc. pp. 1-2.
*Weed Wrench*; www.weedwrench.com/weedwrench/; Weed Wrench Company; 2012; pp. 1-3.

* cited by examiner

*Primary Examiner* — Thomas B Will
*Assistant Examiner* — Joan D Misa
(74) *Attorney, Agent, or Firm* — Fish & Richardson P.C.

(57) ABSTRACT

A tree stump excavation tool for use mounted for rotation from an excavation machine arm has first and second side plates extending from a body and a unitary plate mounted to lower ends of the side plates. The unitary plate has a generally helical profile and defines a blade with multiple, pointed teeth integrally formed along its forward edge. The teeth, disposed for cutting engagement with a substrate of soil and stump roots, are laterally spaced apart along the axis of rotation of the tool and angularly spaced in a direction of substrate ripping motion, wherein the teeth are engaged separately and in sequence for cutting the substrate. An excavation machine with a tree stump excavation tool is also described.

13 Claims, 7 Drawing Sheets

TREE STUMP EXCAVATION TOOL

TECHNICAL FIELD

This invention relates to excavation tools, and, in particular, to tree stump removal excavation tools.

BACKGROUND

Removal of tree stumps is a task that can be time-consuming, and often highly labor intensive. Complete removal of the stump is preferable, but difficult to accomplish, e.g. due to the extensive network of roots embedding the tree stump in the earth.

As an alternative, the task is often addressed by removing only the portion of the tree stump, i.e. that portion exposed above the ground surface and slightly below, by stump grinding. In this process, the tree stump is slowly ground or abraded to level with or just below ground level, but leaving the base portion of the stump and the attached roots buried in the ground. Stump grinder equipment is quite expensive, the process is slow, and it typically requires tapping into the hydraulics of the grinding machine, which can introduce contaminants in the complex hydraulic system of the excavator machine. Additionally, as the stump grindings, the remaining portion of the stump itself, and the tree roots decompose over time, they can become infested with insects, and also produce dangerous sink holes. The stump grindings are also not conducive to healthy new growth in the area.

An excavation tool that has been adapted for removal of tree stumps is described, e.g., in Horton U.S. Pat. No. 7,322,133, the complete disclosure of which is incorporated herein by reference.

SUMMARY

According to one aspect of the disclosure, a tree stump excavation tool configured for use mounted to an arm of an excavation machine, for removal of a tree stump from a substrate, comprises a body configured to be mounted for rotation at an end of the arm of an excavation machine, a first arm having a upper end attached to and extending from the body to form a first side plate and a second arm having a upper end attached to and extending from an opposite, second end of the body to form a second side plate, the first side plate and the second side plate each having an opposite lower end, the lower end of the first side plate being angularly advanced relative to the lower end of the second side plate in a direction of substrate engagement motion, and a unitary plate mounted to extend between the lower end of the first side plate arm and the lower end of the second side plate, the unitary plate defining a blade having a forward edge forming a set of multiple, pointed teeth integrally formed by the plate, each pointed tooth of the set of multiple, pointed teeth being disposed generally in a direction of rotation of the tree stump excavation tool relative to the end of the arm of the excavation machine, and the set of multiple, pointed teeth comprising at least: a first, pointed tooth disposed at the forward edge of the unitary plate for cutting engagement with the substrate and a second pointed tooth disposed at the forward edge of the unitary plate for cutting engagement with the substrate, the first, pointed tooth and the second, pointed tooth being laterally spaced apart along the axis of rotation of the tree stump excavation tool relative to the end of the arm of the excavation tool, the first, pointed tooth being angularly advanced relative to the second, pointed tooth in a direction of substrate ripping motion, wherein the first, pointed tooth and the second pointed tooth are engaged separately and in sequence for cutting the substrate, each pointed tooth being disposed at a predetermined angle to a tangent to an arc of rotation extending generally through a tooth point, with an arc center at an axis of rotation of the tooth point, and the first, pointed tooth, and the second, pointed tooth being non-parallel.

Implementations of this aspect of the disclosure may include one or more of the following additional features. The first side plate defines a leading edge and the second side plate defines a leading edge of contrasting profile. The leading edges of the side plates define cutting profile edges. The set of multiple, pointed teeth further comprises at least a third, pointed tooth disposed at the forward edge of the unitary plate for cutting engagement with a substrate, the third, pointed tooth being laterally spaced apart from the first, pointed tooth and from the second, pointed tooth along the axis of rotation of the tree stump excavation tool, and the third, pointed tooth being angularly spaced from the first, pointed tooth and from the second, pointed tooth in a direction of cutting motion, the third, pointed tooth being non-parallel with the first, pointed tooth and the second, pointed tooth, and a set of tooth tips of the first, pointed tooth, the second, pointed, tooth and the third, pointed tooth being non-planar. The set of multiple, pointed teeth further comprises one or more additional pointed teeth disposed at a forward edge of the unitary plate for ripping engagement with a substrate, each additional pointed tooth being laterally spaced from each other pointed tooth along the axis of rotation of the tree stump excavation tool relative, and each additional pointed tooth being angularly spaced from each other pointed tooth in a direction of ripping motion. The path of motion of the tooth tips of each of the first, pointed tooth and the second, pointed tooth has a predetermined, substantially common radius about the axis of rotation. The front edge of the plate define a cutting profile. Each pointed tooth defines a cutting profile. The unitary blade defines a rear or trailing edge opposite the forward edge, the rear edge defining notches generally in alignment with V-shape indented regions between the adjacent sharp points defined along the forward edge of the blade, and the unitary blade having a form of a flat plate shaped to a generally helical segment of a cylinder, with a flat blade region for each pointed tooth and intervening bend regions between adjacent, pointed teeth, the bend regions extending generally between a V-shape indentation and an associated notch. The unitary plate defines a blade has a generally helical profile viewed from an end of the body.

According to another aspect of the disclosure, an excavation machine with a tree stump excavation tool mounted to an arm of the excavation machine, for removal of a tree stump from a substrate, the tree stump excavation tool comprising: a body configured to be mounted for rotation at an end of the arm of an excavation machine, a first arm having a upper end attached to and extending from the body to form a first side plate and a second arm having a upper end attached to and extending from an opposite, second end of the body to form a second side plate, the first plate and the second side plate each having an opposite lower end, the lower end of the first side plate being angularly advanced relative to the lower end of the second side plate in a direction of substrate engagement motion, and a unitary plate mounted to extend between the lower end of the first side plate arm and the lower end of the second side plate, the unitary plate defining a blade having a forward edge forming a set of multiple, pointed teeth integrally formed by the plate, each pointed tooth of the set of multiple, pointed teeth being disposed generally in a direction of rotation of the tree stump excavation tool relative to the end of the arm of the excavation machine, and the set of multiple, pointed teeth comprising at least: a first, pointed tooth disposed at the forward edge of the unitary plate for cutting engagement with the substrate and a second pointed tooth disposed at the forward edge of the unitary plate for cutting engagement with the substrate, the first, pointed tooth and the second, pointed tooth being laterally spaced apart along the axis of rotation of the tree stump excavation tool relative to the end of the arm of the excavation tool, the first, pointed tooth being angularly advanced relative to the second, pointed tooth in a direction of substrate ripping motion, wherein the first, pointed tooth and the second pointed tooth are engaged separately and in sequence for cutting the substrate, each pointed tooth being disposed at a predetermined angle to a tangent to an arc of rotation extending generally through a tooth point, with an arc center at an axis of rotation of the tooth point, and the first, pointed tooth, and the second, pointed tooth being non-parallel.

Implementations of this aspect of the disclosure may include one or more of the following additional features. The arm is a dipper arm or a boom arm. The unitary plate defines a blade has a generally helical profile viewed from an end of the body.

Drawbacks experienced with prior art devices, tools, and methods for stump removal have been obviated in a novel manner by the excavation tool of the present disclosure. It is, therefore, an outstanding object of the present disclosure to provide excavation tools and systems that can be employed to efficiently and effectively remove tree stumps.

The tree stump excavation tool of this disclosure, as described below, when attached to an excavator or backhoe machine in the manner of an excavation bucket or similar tool, and may be employed in the complete or near complete removal of tree stumps by passing over and about the main body of the stump, while the special integral blade is drawn beneath the body of the stump to sever its roots. In this manner, the staggered, sharp points or teeth of the unitary blade pass into the earth, one pointed tooth at a time, allowing the maximum penetration cutting force to be achieved with each pointed tooth in turn, while the arms of the tool supporting the blade straddle the stump. The blade rips through and cuts the roots under and about the stump, thus allowing the stump to be removed completely, as a unit, leaving only relatively smaller diameter end portion of the roots, typically well below or spaced from the former location of the stump itself. The removed stump can then be scooped up, loaded into a truck, and carted from the scene relatively free of dirt and rocks. The tool can then be used to tamp down the surrounding soil and turf, using the bottom of the blade to smooth the area.

Objectives of this disclosure include: providing excavation tools and systems that allow an operator maximum visibility of the work area for precise excavation, especially around obstacles and utilities; providing excavation tools and systems that apply maximum working force to each of multiple working teeth in turn, including for efficient and effective removal of tree stumps; and providing excavation tools and systems capable of high quality and low cost manufacture, with long and useful service life, and a minimum of maintenance.

Advantages of the tree stump excavation tool of this disclosure include relatively inexpensive operation, e.g. as compared to traditional stump grinders. The tree stump excavation tool facilitates complete or near complete removal of the stump, eliminating stump grinding debris and minimizing buried roots that decompose over time, e.g. creating sink holes. The tree stump excavation tool of the disclosure also does not require hydraulic kits or tapping into the hydraulic system of an expensive excavation machine, thus reducing the likelihood of hydraulic contamination and damage. The configuration of staggered teeth of a unitary blade mounted on an arc, as disclosed herein, achieves maximum cutting force by engaging each cutting tooth of the blade in its turn, one cutting tooth at a time.

The details of one or more implementations of the disclosure are set forth in the accompanying drawings and the description below. Other features, objects, and advantages of the disclosure will be apparent from the description and drawings, and from the claims.

DESCRIPTION OF DRAWINGS

Like reference symbols in the various drawings indicate like elements.

DETAILED DESCRIPTION

Figure 1:
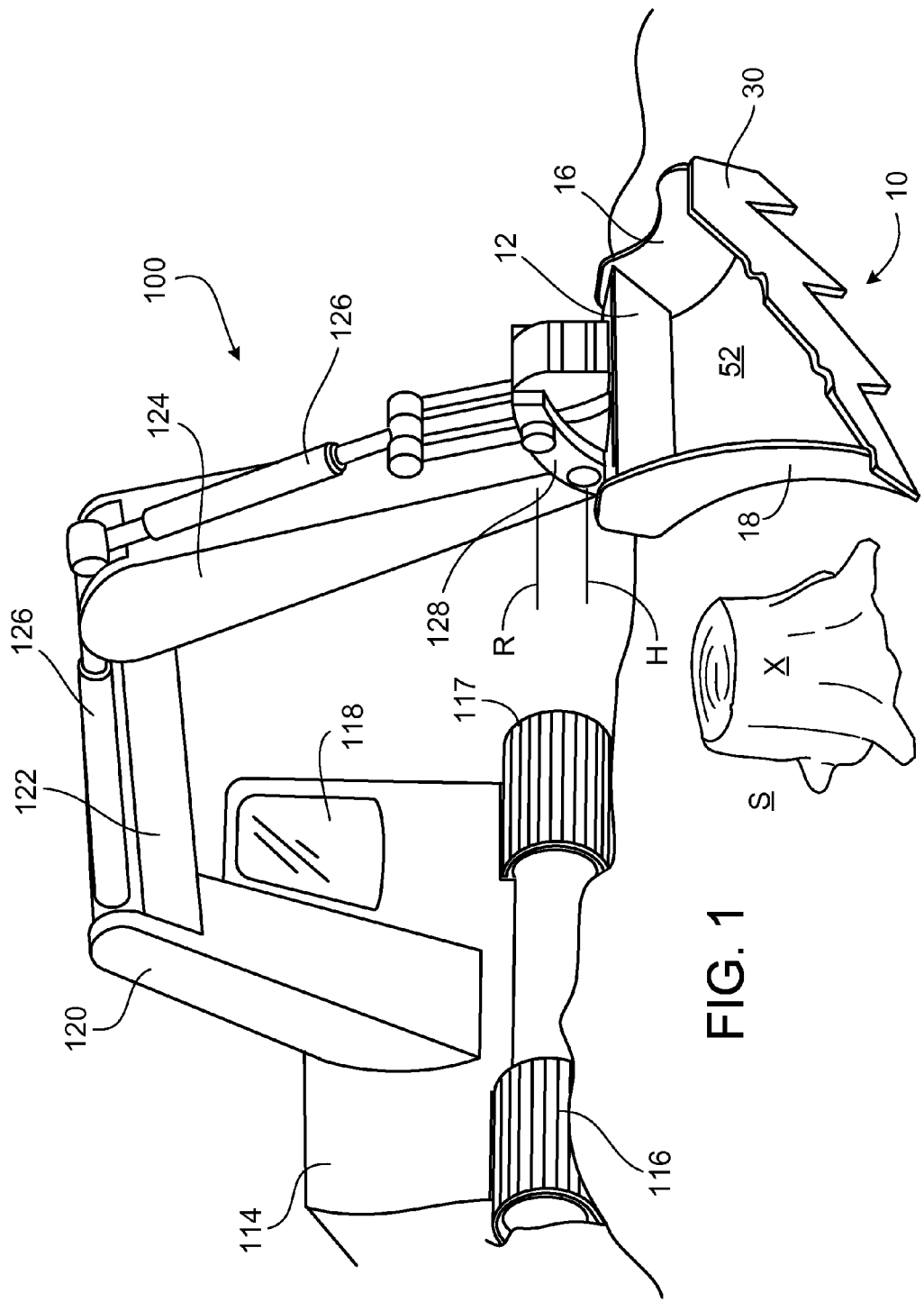
FIG. 1 is a somewhat schematic representation of a hydraulic excavator fitted with the tree stump excavation tool of this disclosure.
Figure 2:
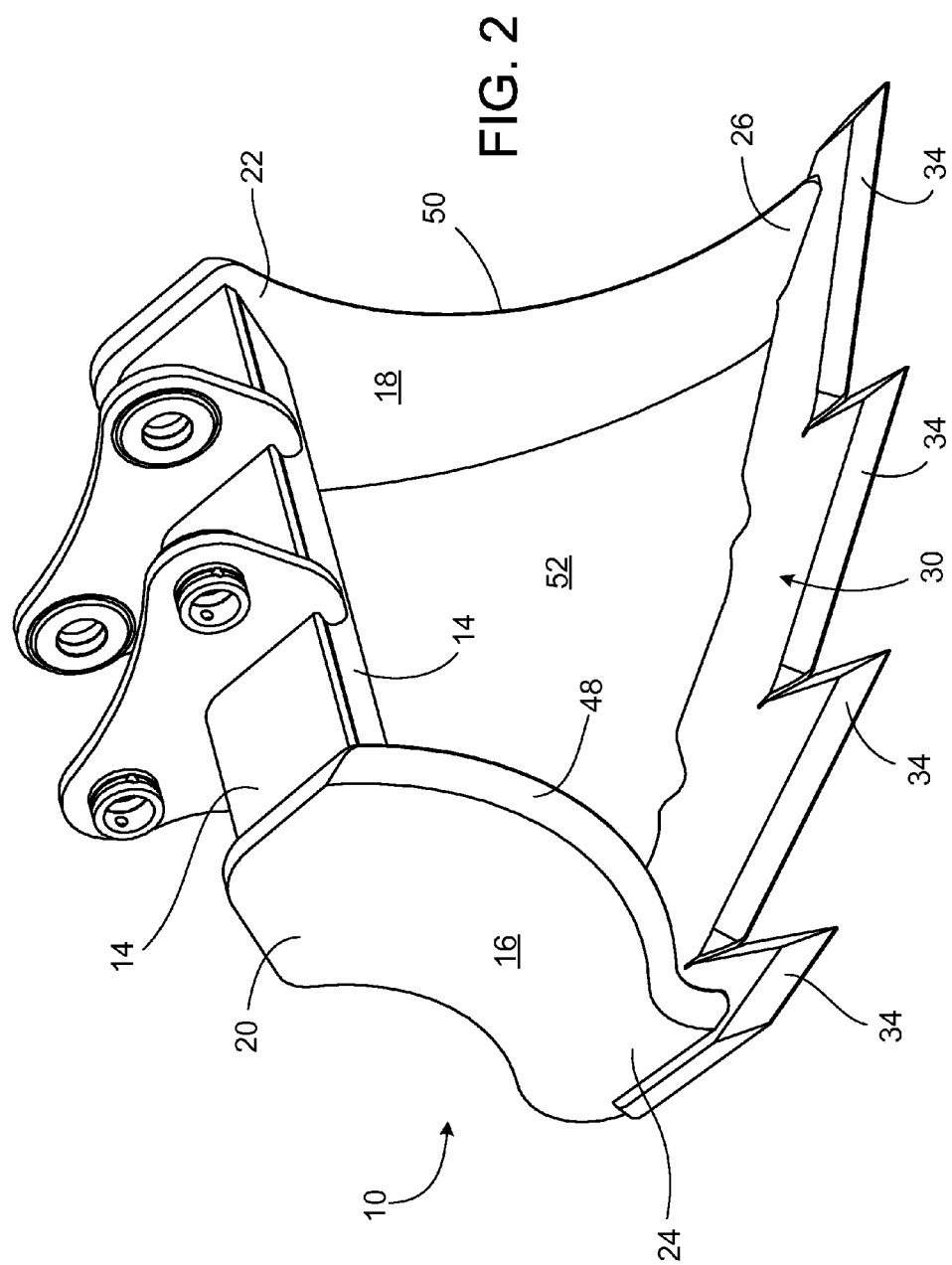
FIG. 2 is a perspective view of the tree stump excavation tool of FIG. 1.

Referring to FIG. 1, an excavation machine, e.g. a hydraulic excavator 100, e.g. of the type suited for use with a tree stump excavation tool 10 of the present disclosure, has a chassis 114, tracks 116 and 117 for mobility, and a cab 118 for the operator. Extending from the chassis 114 is an arm 120, with a boom 122 pivotally attached to the outboard end of the arm, and a dipper stick 124 pivotally attached to the outboard end of the boom. A hydraulic actuator 126 articulates the dipper stick 124. A tree stump excavation tool 10 of this disclosure is mounted from the arm 120, e.g. a dipper arm or a boom arm, of the excavation machine 100 by a quick coupler mechanism 128.

Referring also to FIGS. 2 through 7A and 7B, the tree stump excavation tool 10 has a body 12 consisting of two or more plates 14 that together generally form a tube. A set of first and second side edge plates (or arms) 16, 18 are mounted at respective upper ends 20, 22 to opposite ends of the body 12. Each side edge plate 16, 18 extends generally perpendicular to an axis of rotation, R, of the tree stump excavation tool 10. At their respective lower ends 24, 26, i.e. opposite the upper ends of the arms attached to the body, the side edge plates 16, 18 are also connected by an integral, multi-point or tooth cutting plate 30. As described in more detail below, the side edge plates or arms 16, 18 position the integral blade 30 for engagement with a substrate, S, e.g., the roots and soil surrounding and below a tree stump, X, during a stump removal operation.

Figure 3:
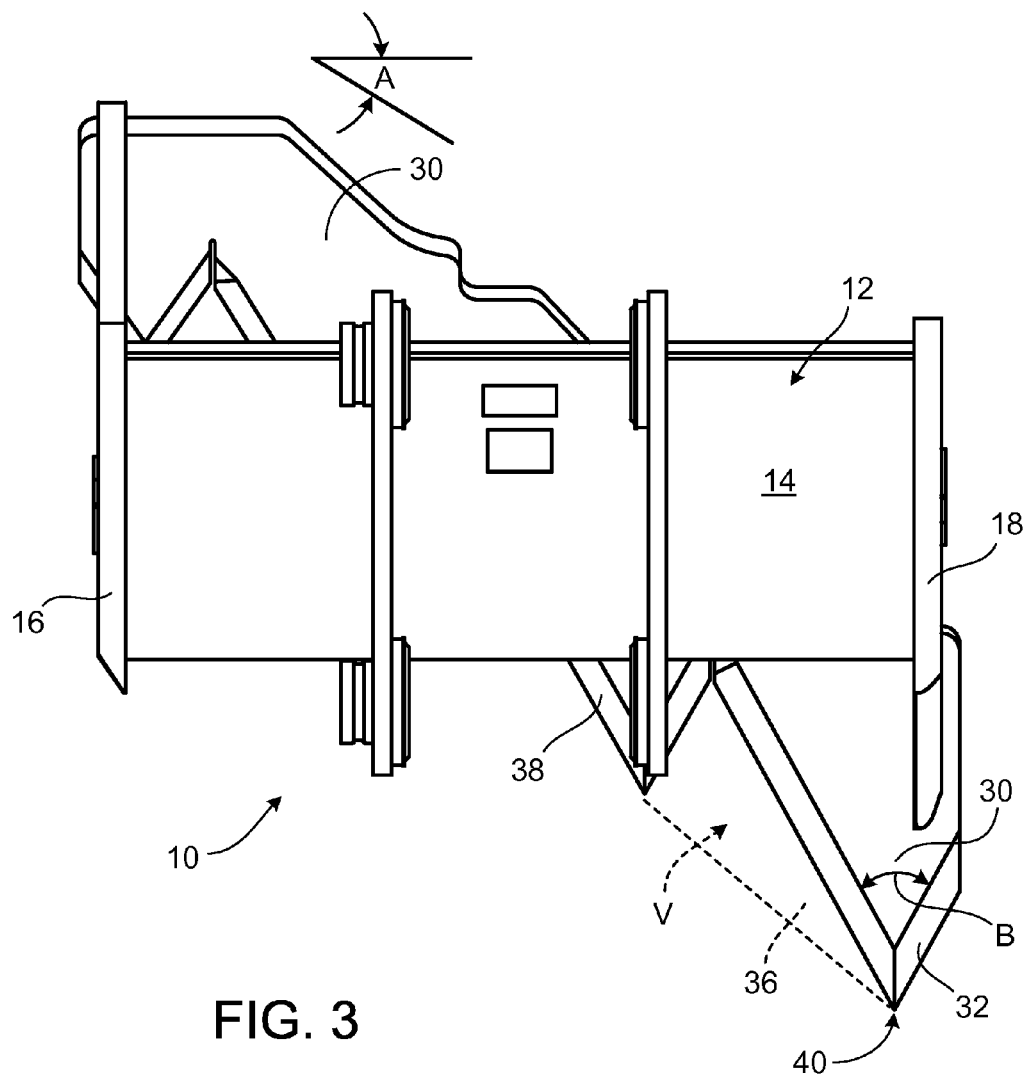
FIG. 3 is a top view of the tree stump excavation tool of FIG. 1.

The forward edge 32 of the integral, angled cutting plate 30 defines a set of sharp or pointed teeth 34. In one implementation, teeth 34 are integral with cutting plate 30 and formed, e.g., by removal of intervening cut-out segments (suggested by dashed line portion 36 in FIG. 3) along the forward edge 32 of the cutting plate 30. As shown in FIG. 3, the pointed teeth 34 can have triangular or beveled edges 38, with pointed tips 40 that are forward-facing, i.e. in direction of rotation of the tool 10. Each pointed tooth 34 subtends an angle, B, e.g. between about 40° to about 65°.

As mentioned above, the first arm 16 has its upper end 20 attached to and extending from the body 12, to form a first side plate, and the second arm 18 has its upper end 22 attached to and extending from an opposite, second end of the body 12, to form a second side plate. The lower ends 24, 26 of the first and second side plates 16, 18 are arranged so that the lower end 24 of the of first side plate 16 is angularly advanced relative to the lower end 26 of the second side plate 16 in a direction of substrate engagement motion, as described more fully below.

The unitary plate 30 mounted to extend between the lower end 24 of the first side plate arm 16 and the lower end 26 of the second side plate 18 has a generally helical profile, e.g. when viewed from an end of the body 12, and defines a blade having a forward edge 32 forming a set of multiple, pointed teeth 34 integrally formed by the plate 30. Each pointed tooth of the set of multiple, pointed teeth is disposed generally in a direction of rotation of the tree stump excavation tool 10, relative to the end of the arm 120 of the excavation machine 100. The set of multiple, pointed teeth 34 includes at least a first, pointed tooth 42 disposed at the forward edge 32 of the unitary plate 30 for cutting engagement with the substrate, S, and a second pointed tooth 44 disposed also at the forward edge 32 of the unitary plate 30 for cutting engagement with the substrate, S. The first, pointed tooth 42 and the second, pointed tooth 44 are laterally spaced apart (arrow, Y) along the axis of rotation, R, of the tree stump excavation tool 10 relative to the end of the arm 120 of the excavation tool 100, and the first, pointed tooth 42 is angularly advanced relative to the second, pointed tooth 44 in a direction of substrate ripping motion (arrow, Z). As a result, during removal of a tree stump X (FIG. 1), the first, pointed tooth 42 and the second pointed tooth 44 are engaged with the substrate surface, S, separately and in sequence for cutting the substrate. The first, pointed tooth 42 and the second, pointed tooth 44 are also non-parallel.

In implementations of the disclosure, the tree stump excavation tool 10 has a set of multiple, pointed teeth 34 that include at least a third, pointed tooth 46 disposed at the forward edge 32 of the unitary plate 30 for cutting engagement with a substrate, S, and in the implementation shown in the drawings, a fourth, point tooth 46' is also provided at the forward edge 32 of the unitary plate 30. Each of these additional pointed teeth 46, 46' is also laterally spaced relative to each other pointed tooth along the axis of rotation, R, of the tree stump excavation tool 10, and each of these additional pointed teeth is also angularly spaced from each other pointed tooth in a direction of ripping motion (arrow, M). The additional pointed teeth are also non-parallel and non-planer with the other pointed teeth.

As mentioned above, the integral cutting plate 30 extends between the first side edge plate 16 and the second side edge plate 18. The cutting plate 30 is disposed at a lateral angle, A, with respect to an axis of rotation, R, i.e., along an axis spanning the width of the body 12. In one implementation, the angle, A, is between about 35° and about 65°, but other angles may be selected.

To facilitate penetration through the substrate, S, and through the underground root structure of the tree stump, X, the first and second arms 16, 18 are provided with beveled forward edges 32, 33, respectively. To similar effect, all of the teeth 34 have leading beveled edges 38 to facilitate penetration through substrate, S, and to facilitate ripping or cutting of tree stump roots. The side edge plates 16, 18, and the individual pointed teeth 34 of the integral plate or blade 30 are laterally spaced apart along the axis of rotation, R, relative to the excavator arm 120, and the teeth 34 are positioned in a direction of substrate-engaging motion (arrow, M), Operation of the tree stump excavation tool of the disclosure will now be described with particular reference to FIG. 1, and also to FIGS. 2 through 7A and 7B. In the case of a generally horizontal substrate, S, the tree stump removal tool 10 is pivoted all the way back at the end of the dipper stick 124 and extended out as far forward of the chassis 114 as possible. The tool 10 is then lowered until the leading pointed tooth 42 engages the substrate, S. The multi-shank ripper excavation tool 10 is then drawn downward and, in ripping motion, toward the chassis 114 to cause the pointed tooth 42 to penetrate the surface of the substrate, S, and to begin ripping the substrate and tree root system. Simultaneously, the multi-shank ripper excavation tool 10 is pivoted forward, so that as each pointed tooth, in succession, breaks through the surface of the substrate, S, and tree root system, the pointed tooth following immediately to the rearward thereof, in turn, contacts and begins breaking through the surface of the substrate, S, and tree root system.

In a tree stump removal operation employing a tree stump removal excavation tool 10 of the disclosure, after the first pointed tooth 42 breaks out material, the machine nosedives, then the second pointed tooth 44 engages the substrate, and this energy is transferred to the second pointed tooth ripping function. After the second pointed tooth 44 breaks free, the same effect reoccurs and on to subsequent teeth 46, 46', etc. Since this machine momentum effect is so powerful, the rearmost pointed teeth 46, 46' are able to rip more aggressively than the first pointed tooth 42. Positioning the tree stump excavation tool arc center, R, higher and forward of the dipper pivot, H (FIG. 1), utilizes this momentum effect.

Since, as described above, no two pointed 34 teeth are in alignment, when the tree stump excavation tool 10 is rolled, each pointed tooth 42, 44, 46, 46' engages generally separately, so that each pointed tooth cuts adjacent to the groove cut by the preceding tooth. Since the tool 10 always has predominately only one pointed tooth 34 engaging the substrate, S, at a time, the majority of the cylinder force is exerted on the single pointed tooth. The groove cut by a leading pointed tooth 42 also facilitates the cutting process of the following pointed teeth 44, 46, 46', etc., with the pointed tooth tips 40 all lying on a constant radius (arc, C) with a center of rotation, R, lying close to the hydraulic excavator dipper stick pivot. The tree stump excavation tool 10 is rolled as the stick is being moved so that all the pointed teeth 42, 44, 46, 46' engage the substrate, S, in sequence. The unitary blade of the tree stump excavation tool 100 passes beneath the stump, X, and the respective first and second side plates 16, 18 pass to along the opposite sides of the stump, to loosen the soil break or cut the roots, while the body of the stump, X, passes through the center void or aperture 52 (FIG. 1) defined by the body 12, arms 16, 18, and blade 30 in combination.

The result is a removal motion that is very powerful, very fast and very effective, but also very smooth and easy on the excavator machine 100 and on the operator. As one pointed tooth breaks free, the next pointed tooth is there to pick up the load. The tool 10 is suitable for removal or ripping of tree stumps in a broad range or soils and conditions while the tool is being rotated and lifted. The ripping action is so powerful that it is important for the operator to take safety precautions against projected objects; hard hats, safety glasses, and an excavator steel mesh windshield guard are all recommended.

The tree stump, X, can then be removed and trucked to a disposal site

Figure 4:
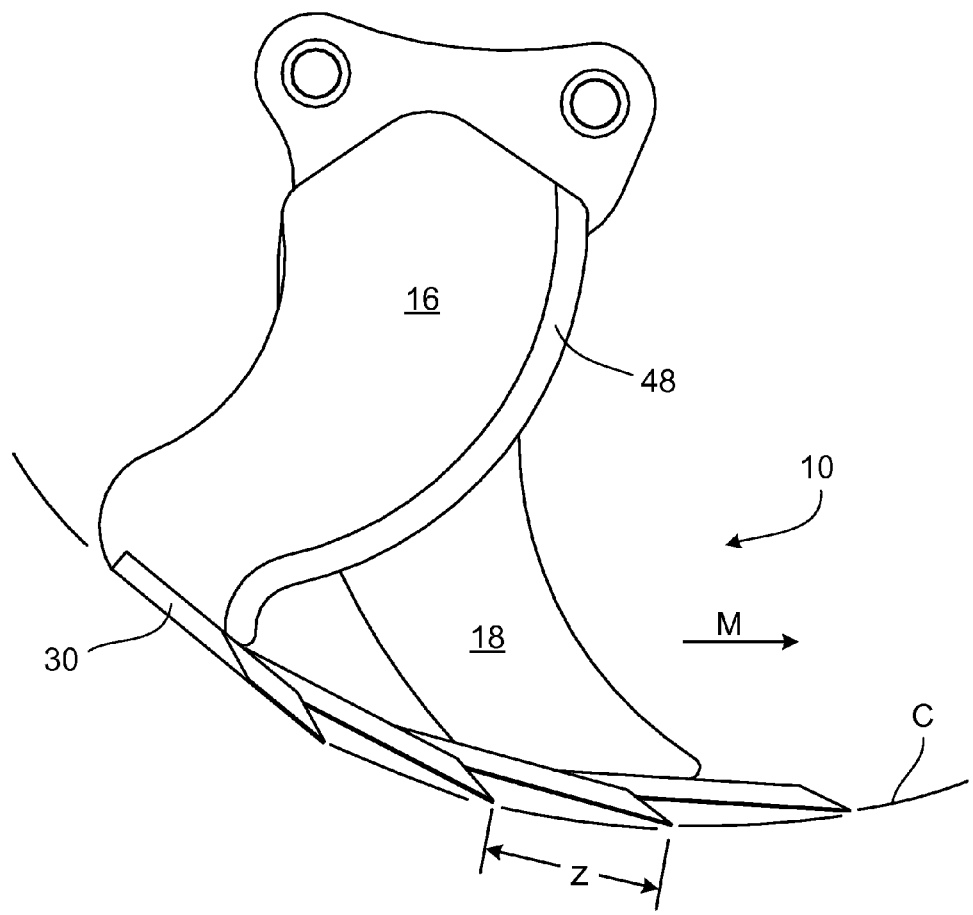
FIG. 4 is a left side view of the tree stump excavation tool of FIG. 1.
Figure 5:
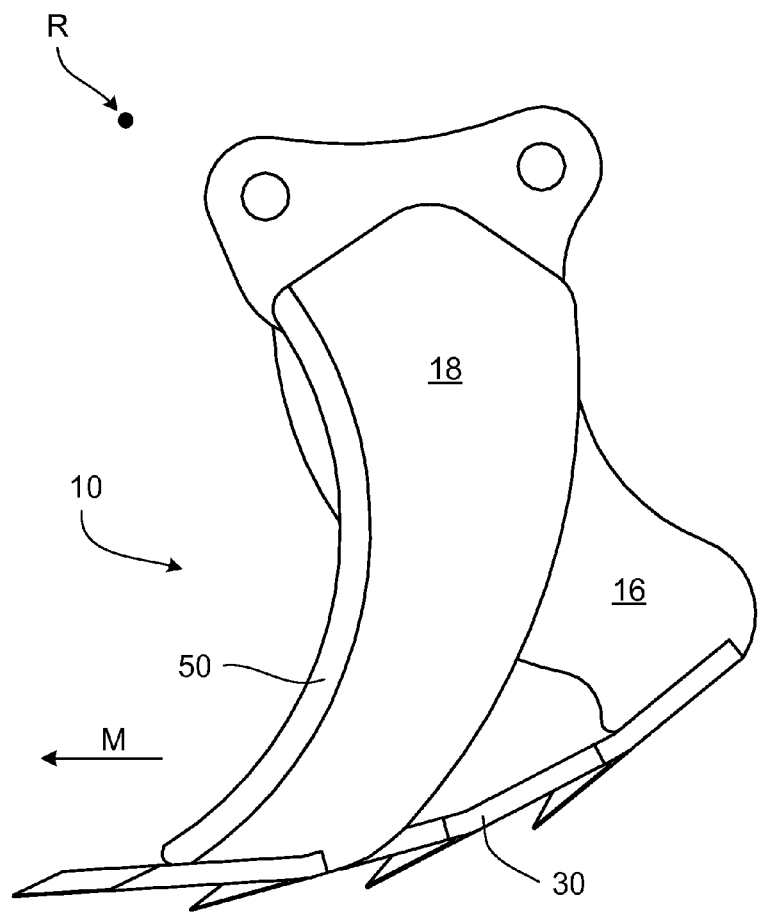
FIG. 5 is a right side view of the tree stump excavation tool of FIG. 1.

In preferred implementations, and as described above, the tree stump excavation tool 10 has pointed teeth 34 positioned with the tooth tips on an arc, C, as best seen in FIG. 4. There can be any number of teeth (two or three or more). As view from the side, the teeth 34 do not lie in a common plane. In preferred implementations, viewed from the front, the first engaging pointed tooth 42 is at the right side, the second and third engaging pointed teeth 44 and 46, respectively lie, in sequence, next to the first pointed tooth 42, and the fourth pointed tooth 46' is at the left. The pointed teeth can be positioned in different order, with the tooth tips lying on the arc, C (as viewed from the side), and the tooth tips are not in the same plane. In the implementation of the disclosure shown in the drawings, right outboard tooth 42 is forward of both of the intermediate or central pointed teeth 44, 46, and forward of the rear tooth 46', but other arrangements can also be employed according to the disclosure, with the pointed teeth disposed in forward, intermediate or central, and rearward positions for excavation tools having three teeth. For example, a center tooth could be the first pointed tooth.

Figure 6:
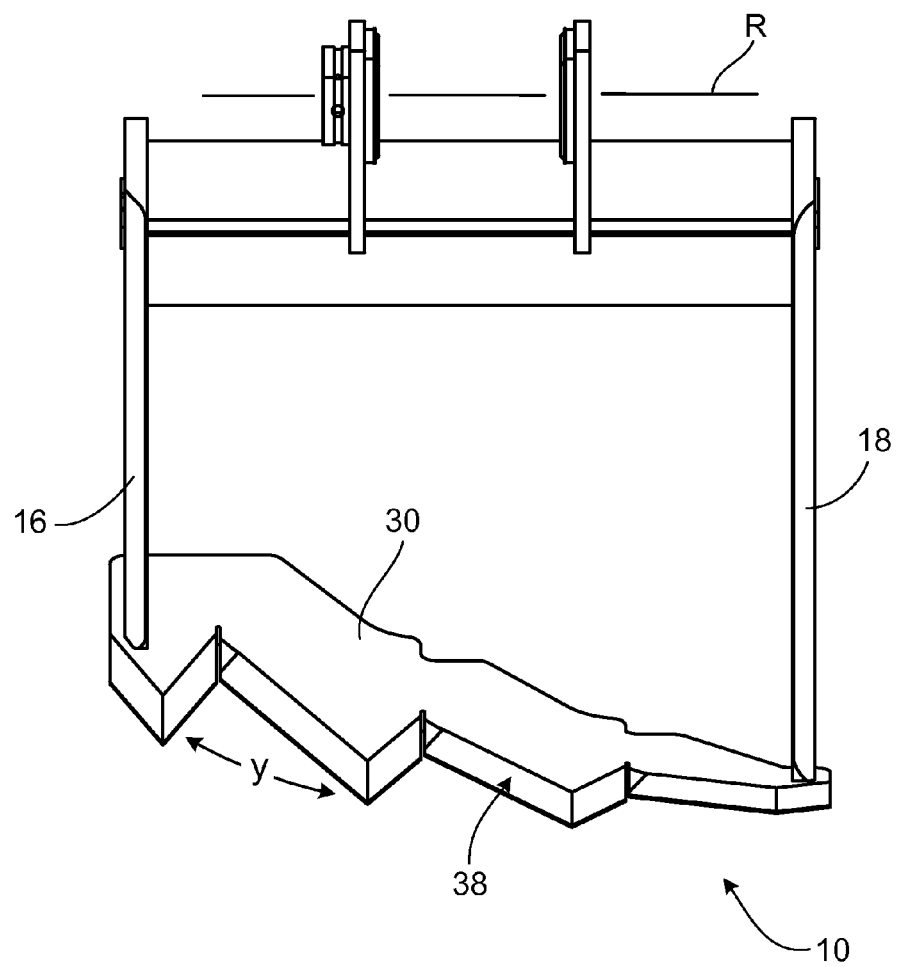
FIG. 6 is a front view of the tree stump excavation tool of FIG. 1.

As best seen from the front view of FIG. 6, cutting plate 30 is skewed, i.e. not parallel, relative to the axis of rotation, R. Cutting plate 30 is attached at the lower ends 24, 26, respectively, of side edge plates 16, 18, spaced from the body 20, with the first side edge plate 16 having a length that is not the same as, e.g., is longer than, the length of second side edge plate 18. In addition, cutting plate 30 is non-planar, i.e. the plate 30 is generally helical in shape, having a general form of a segment of a cylinder.

As the tree stump excavation tool 10 is rotated around axis of rotation, R, this twist of the cutting plate 30 rotates each tooth tip sequentially into a forward direction, concentrating all of the forces at the teeth tips 40 to maximize cutting ability. This twist of the cutting plate 50 may be made continuous, e.g., by rolling a solid plate, or may be achieved by a series of bends in the plate 30, with the bending process facilitated by notches 54 formed in the rear edge 56 of cutting plate 30.

Figure 7B:
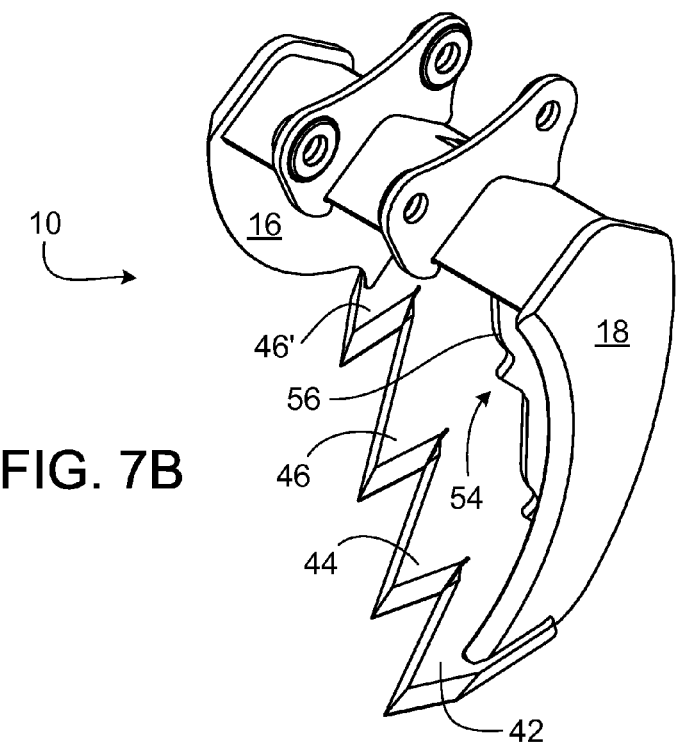
FIGS. 7A and 7B are side and rear perspective views of the tree stump excavation tool of FIG. 1.
Figure 7A:
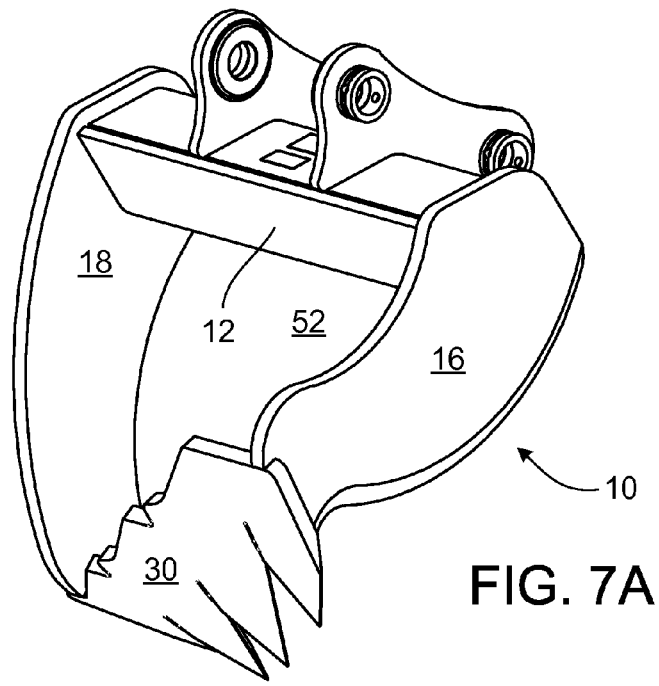

As best seen in FIGS. 6 and 7B, the body 20, the first and second side edge plates 16, 18, and the cutting plate 30 outline a generally rectangular void area, 52. During a removal operation of a tree stump, X, the operator positions the tree stump excavation tool 10 so that the side edge plates 16, 18 are at either side of the tree stump. The sharpness of the side plate edges 48, 50 and front edge 38 permit the first and second side edge plates 16, 18 and cutting plate 30 to slice through the packed earth and roots surrounding the tree stump. By applying force to the tree stump excavation tool 10, the cutting plate 30 can be positioned to pass beneath the tree stump, facilitating cutting of the earth and roots both around and beneath the tree stump. The void area 52 permits the tree stump to pass through the center of the tree stump excavation tool 10, freeing the stump from ensnaring roots.

The tree stump excavation tool 10 can be manufactured using various suitable materials. For example, in preferred implementations, the first and second arms 16, 18 and the unitary cutting plate 30 are fabricated from high strength alloy steel, for enhanced resistance to abrasive and cold weather conditions.

A number of implementations of the disclosure have been described. Nevertheless, it will be understood that various modifications may be made without departing from the spirit and scope of the disclosure. For example, the leading edges of the pointed teeth 34 may be scalloped, to help slice through the hard packed substrate. Alternatively, the leading edges of the pointed teeth 34 may be serrated. In a further implementation, the pointed teeth 34 may be angled relative to the forward edge 32 of unitary cutting plate 30. Accordingly, other implementations are within the scope of the following claims.

What is claimed is:

1. A tree stump excavation tool configured for use, mounted to an arm of an excavation machine, for removal of a tree stump from a substrate, said tree stump excavation tool comprising:
    a body configured to be mounted for rotation at an end of the arm of an excavation machine,
    a first arm having a upper end attached to and extending from said body to form a first side plate and a second arm having a upper end attached to and extending from an opposite, second end of said body to form a second side plate, said first side plate and said second side plate each having an opposite lower end, the lower end of said first side plate being angularly advanced relative to the lower end of said second side plate in a direction of substrate engagement motion, and
    a unitary plate mounted to extend between the lower end of said first side plate arm and the lower end of said second side plate, said unitary plate defining a blade having an axis of rotation and a forward edge forming a set of multiple, pointed teeth integrally formed by the plate,
        each pointed tooth of said set of multiple, pointed teeth being disposed generally in a direction of rotation of said tree stump excavation tool relative to the end of the arm of the excavation machine and defining a pair of opposite tooth blade side edges disposed non-parallel to the axis of rotation of the blade and non-planar relative to the pairs of opposite tooth blade side edges of other pointed teeth of said set of multiple, pointed teeth, and
        said set of multiple, pointed teeth comprising at least:
            a first, pointed tooth disposed at the forward edge of the unitary plate for cutting engagement with the substrate and a second pointed tooth disposed at the forward edge of the unitary plate for cutting engagement with the substrate,
        said first, pointed tooth and said second, pointed tooth being laterally spaced apart along the axis of rotation of said tree stump excavation tool relative to the end of the arm of the excavation tool,
        said first, pointed tooth being angularly advanced relative to said second, pointed tooth in a direction of substrate ripping motion, wherein said first, pointed tooth and said second pointed tooth are engaged separately and in sequence for cutting the substrate,
        each said pointed tooth being disposed at a predetermined angle to a tangent to an arc of rotation extending generally through a tooth point, with an arc center at an axis of rotation of said tooth point, and
        said first, pointed tooth, and said second, pointed tooth being non-parallel relative to the axis of rotation.

2. The tree stump excavation tool of claim 1, wherein said first side plate defines a leading edge having a first profile and said second side plate defines a leading edge having a contrasting second profile, and said leading edges of said first side plate and said second side plate defining cutting profile edges.

3. The tree stump excavation tool of claim 1, wherein said set of multiple, pointed teeth further comprises at least a third, pointed tooth disposed at the forward edge of the unitary plate for cutting engagement with a substrate and defining a pair of opposite tooth blade side edges disposed non-parallel to the axis of rotation of the blade and non-planar relative to the pairs of opposite tooth blade side edges of other pointed teeth of said set of multiple, pointed teeth, said third, pointed tooth being laterally spaced apart from said first, pointed tooth and from said second, pointed tooth along the axis of rotation of said tree stump excavation tool, and said third, pointed tooth being angularly spaced from said first, pointed tooth and from said second, pointed tooth in a direction of cutting motion, said third, pointed tooth being non-parallel relative to the axis of rotation with said first, pointed tooth and said second, pointed tooth, and a set of tooth tips of said first, pointed tooth, said second, pointed, tooth and said third, pointed tooth being non-planar.

4. The tree stump excavation tool of claim 1, wherein said set of multiple, pointed teeth further comprises one or more additional pointed teeth disposed at a forward edge of said unitary plate for ripping engagement with a substrate and each defining a pair of opposite tooth blade side edges disposed non-parallel to the axis of rotation of the blade and non-planar relative to the pairs of opposite tooth blade side edges of other pointed teeth of said set of multiple, pointed teeth, each said additional pointed tooth being laterally spaced from each other pointed tooth along the axis of rotation of said tree stump excavation tool, and each said additional pointed tooth being angularly spaced from each other pointed tooth in a direction of ripping motion.

5. The tree stump excavation tool of claim 1, wherein a tooth tip of said first, pointed tooth and a tooth tip of said second, pointed tooth each has a path of motion having a predetermined, substantially common radius about said axis of rotation.

6. The tree stump excavation tool of claim 1, wherein said forward edge of said unitary plate defines a cutting profile non-parallel relative to the axis of rotation.

7. The tree stump excavation tool of claim 1, wherein each said pointed tooth defines a cutting profile non-parallel relative to the axis of rotation.

8. The tree stump excavation tool of claim 1, wherein said blade defined by said unitary plate defines a rear or trailing edge opposite the forward edge, the rear edge defining notches generally in alignment with V-shape indented regions between adjacent of the pointed teeth defining sharp points along the forward edge of the blade, and said unitary blade having a form of a flat plate shaped to a generally helical segment of a cylinder, with a flat blade region for each pointed tooth and intervening bend regions between adjacent, pointed teeth, the bend regions extending generally between a V-shape indentation and an associated notch.

9. The tree stump excavation tool of claim 1, wherein said unitary plate defines a blade having a generally helical profile viewed from an end of the body.

10. An excavation machine with a tree stump excavation tool mounted to an arm of the excavation machine, for removal of a tree stump from a substrate, said tree stump excavation tool comprising:

a body configured to be mounted for rotation at an end of the arm of an excavation machine, a first arm having a upper end attached to and extending from said body to form a first side plate and a second arm having a upper end attached to and extending from an opposite, second end of said body to form a second side plate, said first said plate and said second side plate each having an opposite lower end, the lower end of said first side plate being angularly advanced relative to the lower end of said second side plate in a direction of substrate engagement motion, and a unitary plate mounted to extend between the lower end of said first side plate and the lower end of said second side plate, said unitary plate defining a blade having an axis of rotation and a forward edge forming a set of multiple, pointed teeth integrally formed by the plate, each pointed tooth of said set of multiple, pointed teeth being disposed generally in a direction of rotation of said tree stump excavation tool relative to the end of the arm of the excavation machine and defining a pair of opposite tooth blade side edges disposed non-parallel to the axis of rotation of the blade and non-planar relative to the pairs of opposite tooth blade side edges of other pointed teeth of said set of multiple, pointed teeth, and said set of multiple, pointed teeth comprising at least:

a first, pointed tooth disposed at the forward edge of the unitary plate for cutting engagement with the substrate and a second pointed tooth disposed at the forward edge of the unitary plate for cutting engagement with the substrate, said first, pointed tooth and said second, pointed tooth being laterally spaced apart along the axis of rotation of said tree stump excavation tool relative to the end of the arm of the excavation tool, said first, pointed tooth being angularly advanced relative to said second, pointed tooth in a direction of substrate ripping motion, wherein said first, pointed tooth and said second pointed tooth are engaged separately and in sequence for cutting the substrate, each said pointed tooth being disposed at a predetermined angle to a tangent to an arc of rotation extending generally through a tooth point, with an arc center at an axis of rotation of said tooth point, and said first, pointed tooth and said second, pointed tooth being non-parallel relative to the axis of rotation.

11. The excavation machine of claim 10, wherein the arm is a dipper arm.

12. The excavation machine of claim 10, wherein the arm is a boom arm.

13. The excavation machine of claim 10, wherein said unitary plate defines a blade having a generally helical profile viewed from an end of the body.

* * * * *

UNITED STATES PATENT AND TRADEMARK OFFICE
CERTIFICATE OF CORRECTION

| | |
|---|---|
| PATENT NO. | : 9,043,963 B2 |
| APPLICATION NO. | : 13/737618 |
| DATED | : June 2, 2015 |
| INVENTOR(S) | : Lee A. Horton |

It is certified that error appears in the above-identified patent and that said Letters Patent is hereby corrected as shown below:

In the claims

Col. 10, line 7, Claim 10, delete "first said" and insert -- first side --, therefor.

Signed and Sealed this
Twenty-seventh Day of October, 2015

Michelle K. Lee
*Director of the United States Patent and Trademark Office*